US008621364B2

(12) United States Patent  
Ito

(10) Patent No.: US 8,621,364 B2  
(45) Date of Patent: Dec. 31, 2013

(54) DELETING A BROWSER'S HISTORY WHEN A DIFFERENT WEB APPLICATION IS SELECTED

(75) Inventor: Mario Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 13/118,875

(22) Filed: May 31, 2011

(65) Prior Publication Data

US 2012/0005600 A1 Jan. 5, 2012

(30) Foreign Application Priority Data

Jun. 30, 2010 (JP) ................................. 2010-150258

(51) Int. Cl.
*G06F 3/00* (2006.01)
(52) U.S. Cl.
USPC .............................. 715/745; 715/205; 726/26
(58) Field of Classification Search
None
See application file for complete search history.

(56) References Cited

U.S. PATENT DOCUMENTS

| 7,100,114 B1 * | 8/2006 | Burleson ....................... 715/744 |
| 7,463,290 B2 | 12/2008 | Tojo et al. |
| 2005/0204292 A1 * | 9/2005 | Kibilov et al. ................ 715/738 |
| 2006/0101078 A1 * | 5/2006 | Tashiro et al. ............. 707/104.1 |
| 2008/0043282 A1 * | 2/2008 | Tsuboi ......................... 358/1.15 |
| 2012/0284286 A1 * | 11/2012 | Zwaal ........................... 707/752 |

FOREIGN PATENT DOCUMENTS

JP 2006-134261 A 5/2006

* cited by examiner

*Primary Examiner* — Stephen Hong  
*Assistant Examiner* — Asher Kells  
(74) *Attorney, Agent, or Firm* — Fitzpatrick, Cella, Harper & Scinto

(57) ABSTRACT

This invention provides an information processing apparatus capable of more reliably preventing inconvenience to the user, that may occur upon a transition of the Web page using the display history of a Web browser. The information processing apparatus can communicate with a Web server via a network and displays, in a Web browser, a screen provided by the Web server. A holding unit holds the display history of a Web page that is previously displayed in the Web browser. A determination unit refers to the display history held in the holding unit to determine whether a Web application different from that activated at the latest time via the Web browser is activated. A deletion control unit deletes the display history held in the holding unit if the determination unit determines that the different Web application is activated.

11 Claims, 4 Drawing Sheets

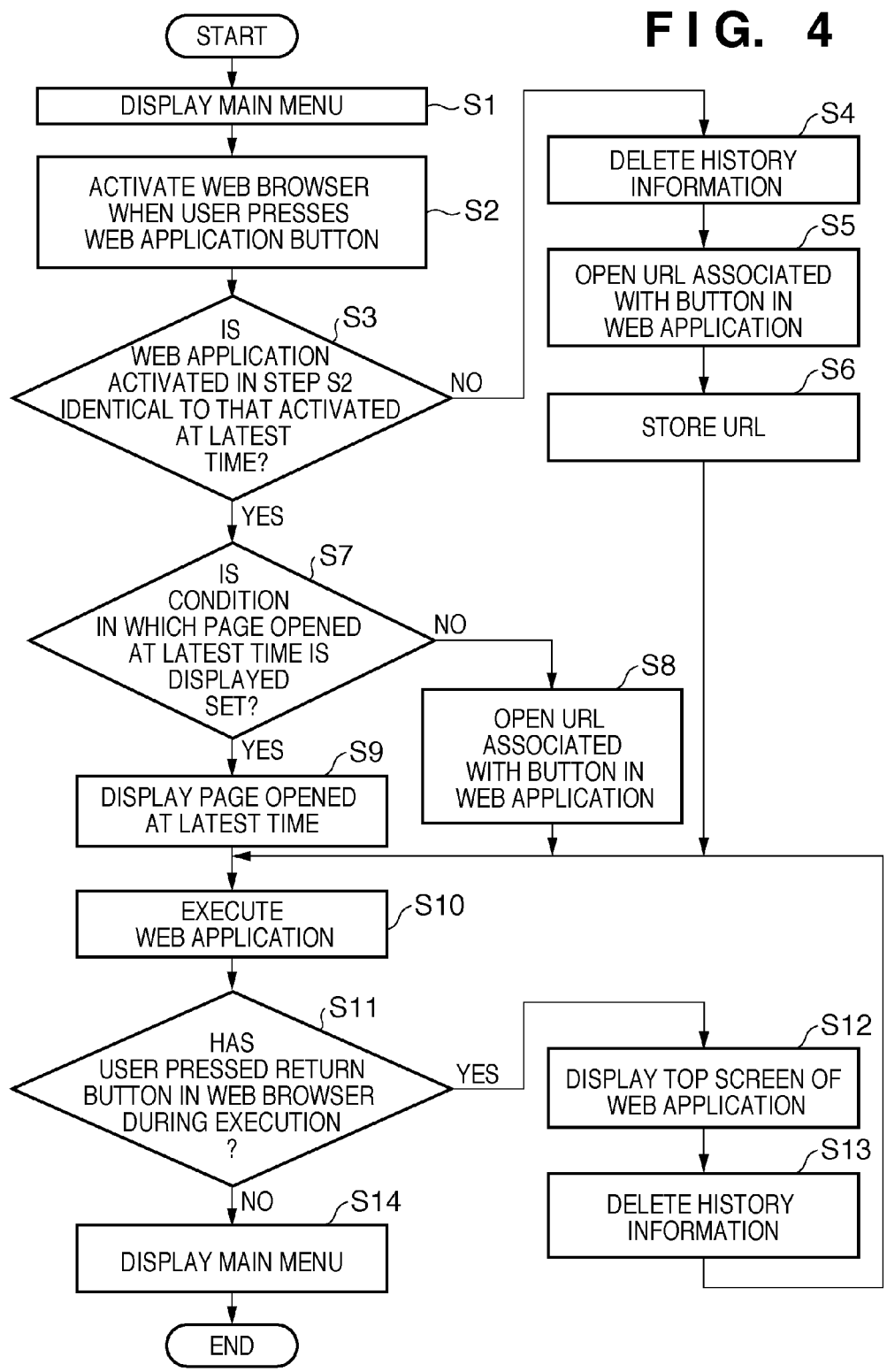

DELETING A BROWSER'S HISTORY WHEN A DIFFERENT WEB APPLICATION IS SELECTED

BACKGROUND OF THE INVENTION

1. Field of the Invention

The present invention relates to an information processing apparatus on which a Web browser is installed, a method of controlling the same, and a program.

2. Description of the Related Art

In recent years, various information processing apparatuses have Web browsers installed on them. Especially to use a Web application in the same way as in a native application, the Web application is often executed using a Web browser. To execute a Web application of a Web server serving as an external device using a Web browser, and especially to deal with information with high confidentiality, higher security performance is required.

Note that the history information browsed in the past is recorded in the Web browser, and is not erased unless the user logs out or explicitly deletes it by his or her operation. Hence, to improve the security performance, Japanese Patent Laid-Open No. 2006-134261, for example, proposes a method of erasing the history information of a Web browser at a predetermined timing.

However, in the technique disclosed in Japanese Patent Laid-Open No. 2006-134261, while a Web application selected by the user is executed using the Web browser, when the user presses a return button for the purpose of redoing this execution processing, a return to the Web page of the Web application executed before the Web application currently being executed may be made, depending on the settings. Hence, if a Web application different from that currently being executed is activated, it is not a Web application intended by the user, so not only the user falls into confusion but also the need arises to doubly execute the Web application that has already been processed. Especially when billing incurs in proportion to the usage of a Web application, inconvenience such as double billing often occurs.

SUMMARY OF THE INVENTION

The present invention has been made in consideration of the above-mentioned problem, and provides an information processing apparatus which more reliably prevents inconvenience to the user, that may occur upon a transition of the Web page using the display history of a Web browser, a method of controlling the same, and a program.

According to one aspect of the present invention, an information processing apparatus which can communicate with a Web server via a network and displays, in a Web browser, a screen provided by the Web server is provided. The apparatus includes a holding unit which holds a display history of a Web page that is previously displayed in the Web browser, a determination unit which refers to the display history held in the holding unit to determine whether a Web application different from a Web application activated at the latest time via the Web browser is activated, and a deletion control unit which deletes the display history held in the holding unit if the determination unit determines that the different Web application is activated.

Further features of the present invention will become apparent from the following description of exemplary embodiments with reference to the attached drawings.

BRIEF DESCRIPTION OF THE DRAWINGS

FIG. 4 is a flowchart showing a processing procedure of an image processing system.

DESCRIPTION OF THE EMBODIMENTS

Embodiments of the present invention will be described in detail below with reference to the accompanying drawings. Note that the following embodiments do not limit the scope of claims, and not all combinations of features to be described in these embodiments are indispensable to means for solving the problems of this invention.

Figure 1:
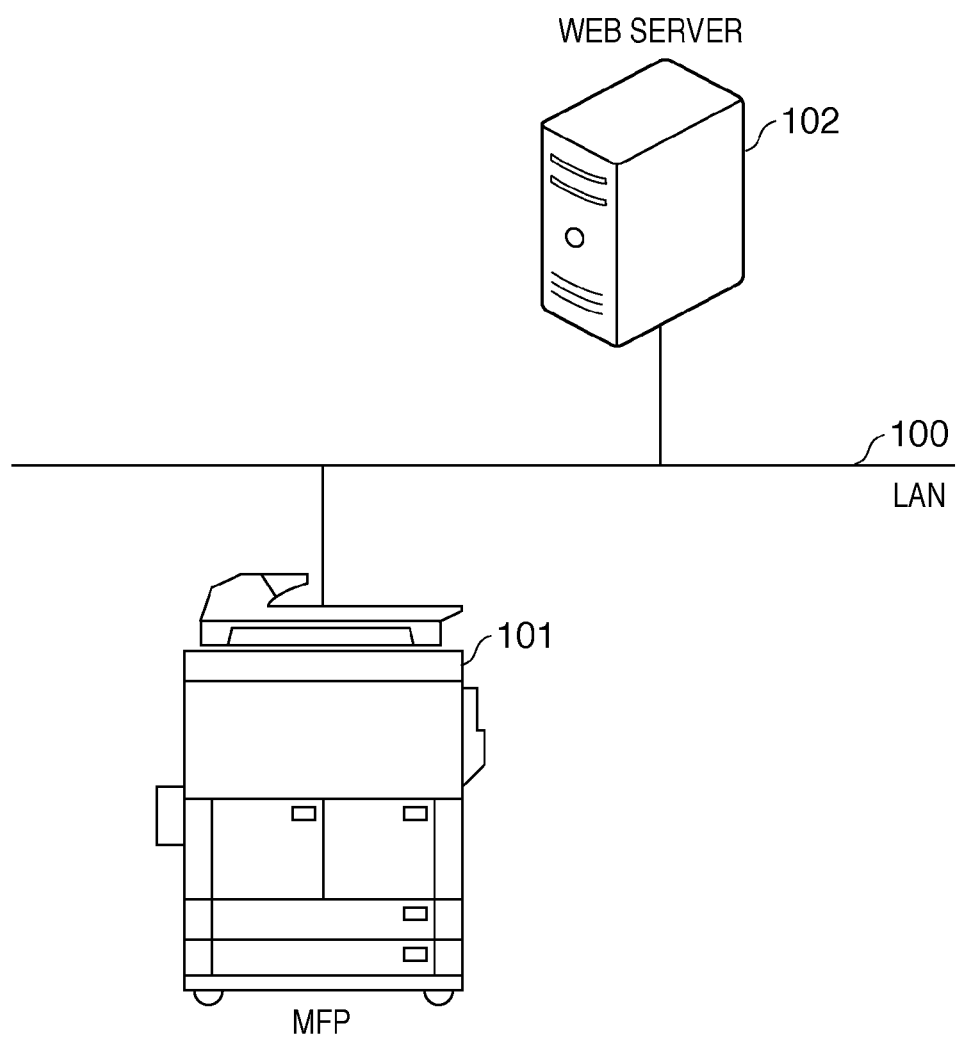
FIG. 1 is a diagram showing the overall configuration of an image processing system according to an embodiment of the present invention.
Figure 2A:
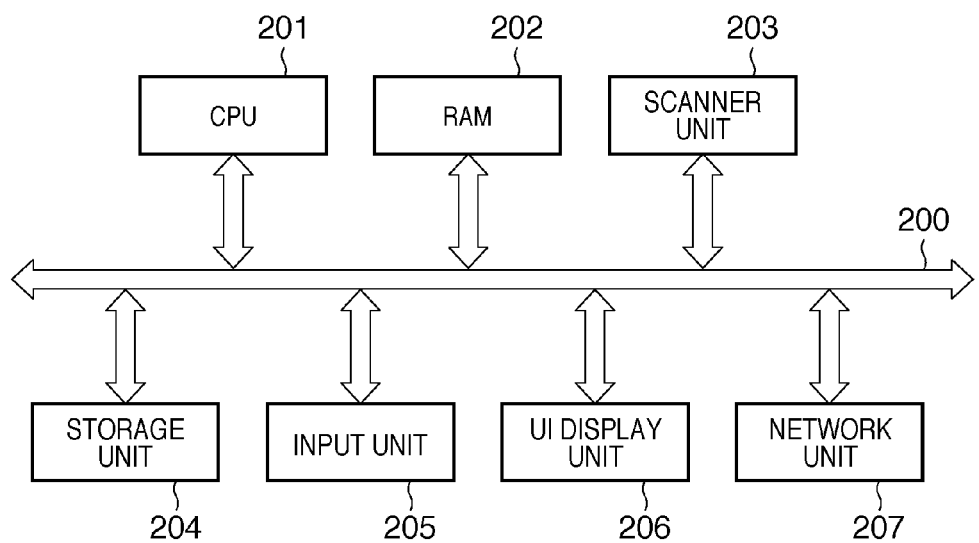
FIGS. 2A and 2B are block diagrams showing the configurations of an image processing apparatus and Web server.
Figure 2B:
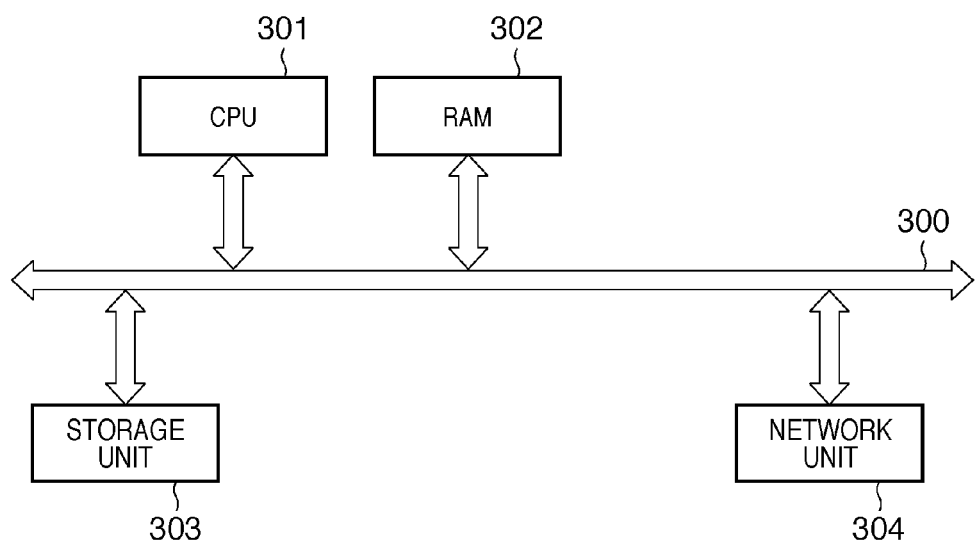

<Hardware Configuration of Image Processing System (FIGS. 1 to 3A and 3B)>
[Overall Configuration (FIG. 1)]

An image processing system according to this embodiment includes an image processing apparatus 101 and Web server 102. The image processing apparatus 101 and Web server 102 are communicably connected to each other via a network 100. The network 100 is a basic unit for allowing the apparatuses to communicate with each other, and may be, for example, an intranet, the Internet, or other network systems.

The image processing apparatus 101 has a Web browser function, and an MFP (Multiple Function Peripheral) having a plurality of functions such as a print function and a scan function is assumed as this apparatus. The Web server 102 has a function of delivering a Web content via a network, and sends back a Web content in response to a request from the image processing apparatus 101.

[Configuration of Image Processing Apparatus (FIG. 2A)]

The image processing apparatus 101 includes a CPU 201 that controls the overall image processing apparatus, a RAM 202 which provides a work area for the CPU 201, a scanner unit 203 which scans an image, a storage unit 204 which stores a program and various settings, an input unit 205 which allows the user to input a command, a UI display unit 206 which performs screen display, a network unit 207 which communicates with other devices via a network, and a main bus 200.

Figure 3A:
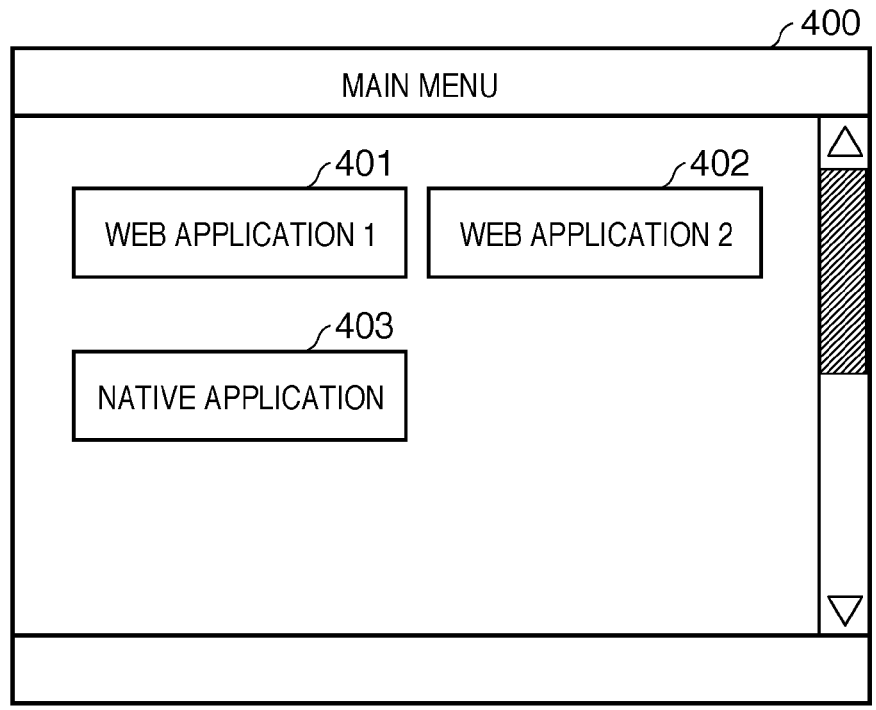
FIGS. 3A and 3B are views showing the main menu screen and the content display screen of a Web browser.
Figure 3B:
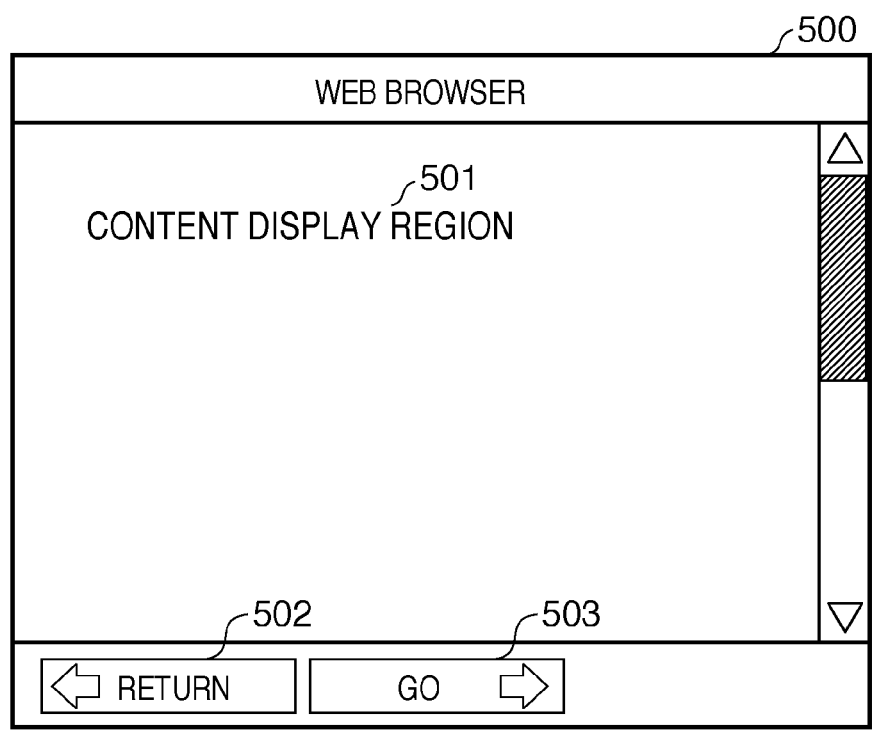

Examples of the storage unit 204 include an HDD and an NVRAM. The input unit 205 includes a main menu button used to transit the screen to the main menu screen (FIG. 3A).

Note that in the image processing apparatus 101, the CPU 201 controls the RAM 202, scanner unit 203, storage unit 204, input unit 205, UI display unit 206, and network unit 207 via the main bus 200. The input unit 205 and UI display unit 206 may be a single touch panel having both their functions.

[Configuration of Web Server (FIG. 2B)]

The Web server 102 includes a CPU 301 which controls the overall server, a RAM 302 which provides a work area for the CPU 301, a storage unit 303 which stores a program and various settings, a network unit 304 which communicates with other devices via a network, and a main bus 300.

Note that the CPU 301 controls the RAM 302, storage unit 303, and network unit 304 via the main bus 300.

[Example of Main Menu Screen (FIG. 3A)]

A main menu screen 400 serves as a screen on which buttons used to select Web applications to be activated are arranged, and is displayed on the UI display unit 206. The buttons include Web application buttons 401 and 402 associated with different URLs, and a native application button 403 provided in the image processing apparatus itself.

When the user presses the Web application button 401 or 402, a Web browser is activated, and a Web page corresponding to a URL associated with the pressed Web application button 401 or 402 is displayed.

The Web browser of the image processing apparatus 101 may be always kept activated so that the Web browser appears on the front screen when the user presses the Web application button 401 or 402. The native application button 403 is a button used to execute a program stored in the RAM 202 or storage unit 204.

[Example of Web Browser Screen (FIG. 3B)]

A Web browser screen 500 is displayed on the UI display unit 206. The Web browser screen 500 displays a content display region 501 for displaying a Web page acquired from the Web server 102, a return button 502 for making a return to the immediately preceding screen, and a go button 503 for making an advance to an immediately subsequent screen from the screen to which a return is made using the return button 502. The Web browser holds the history of screen transitions.

The return button 502 may have a function of making a return to the main menu screen 400 when it is used on the screen displayed immediately after a transition from the main menu screen 400. Also, a return function and a go function may be executable as Java® Script, instead of being implemented using buttons.

<Processing Procedure of Image Processing System (FIG. 4)>

First, the image processing apparatus 101 displays the main menu screen 400 on the UI display unit 206 (S1). When the user presses the Web application button 401 or 402 via the input unit 205, the image processing apparatus 101 determines the URL of a content displayed in the content display region 501 of a Web browser, and activates the Web browser (S2). Processing of displaying, on the front screen, the Web browser having already been activated may be performed.

The image processing apparatus 101 determines whether the Web application activated in step S2 is identical to that activated at the latest time (S3). This determination can be done by, for example, comparing the URL determined in step S2 and that of the Web page opened at the latest time or comparing the hash value of a Web content corresponding to the URL determined in step S2 and that of a Web content displayed at the latest time.

If it is determined in step S3 that the activated Web application is not identical to that activated at the latest time, the image processing apparatus 101 deletes the history information (display history) of the return button 502 and go button 503 in the Web browser (S4). Not only the history information of the return button 502 and go button 503 but also the URL history of the Web browser may be deleted. Also, the history information of the return button 502 and go button 503 may be deleted at the timing at which the URL history is deleted by the user's operation.

The image processing apparatus 101 opens a Web page corresponding to the URL determined in step S2 (S5). The image processing apparatus 101 stores the URL determined in step S2 in the RAM 202 or storage unit 204 (S6), and the process advances to step S10. Information associated with the selected button may be stored.

On the other hand, if it is determined in step S3 that the activated Web application is identical to that activated at the latest time, the image processing apparatus 101 reads the settings stored in the RAM 202 or storage unit 204, and determines in the Web browser activated in step S2 whether the condition in which the Web page opened at the latest time is displayed is set (S7). If the condition in which the Web page opened at the latest time is not displayed is set, the image processing apparatus 101 opens the Web page corresponding to the URL determined in step S2 (S8), and the process advances to step S10. On the other hand, if the condition in which the Web page opened at the latest time is displayed is set, the image processing apparatus 101 displays the Web page opened at the latest time, based on the history information of the return button 502 and go button 503 (S9), and the process advances to step S10.

In step S10, the image processing apparatus 101 executes a Web application in accordance with the user's operation (or automatically). After that, the image processing apparatus 101 determines whether the user has pressed the return button 502 in the Web browser while the Web application is executed (S11). If the process of the Web application ends as the user has not pressed the return button 502, the image processing apparatus 101 displays the main menu screen 400 on the UI display unit 206 again (S14), and a series of processes ends.

On the other hand, if the user has pressed the return button 502 (that is, if the user has instructed to transit to the Web page that is previously displayed by the user), the image processing apparatus 101 displays the top screen of the Web application on the UI display unit 206 (S12). The top screen means a Web page corresponding to the URL determined in step S2. The image processing apparatus 101 deletes the history information of the return button 502 and go button 503 in the Web browser (S13), and the process returns to step S10.

As has been described above, according to the embodiment, when the return button 502 is pressed in the Web browser running on the image processing apparatus 101, the history information of the return button 502 and go button 503 is deleted to prohibit a return to the Web application executed previously, thus making it possible to reduce the user's confusion and misoperations.

Although an image processing apparatus such as an MFP is assumed as an example of an information processing apparatus in the above-described embodiment, the present invention is not limited to an image processing apparatus as long as it includes a Web browser and exchanges various types of data with a Web server. The information processing apparatus may be, for example, an information terminal such as a personal computer or a mobile phone.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-150258, filed Jun. 30, 2010, which is hereby incorporated by reference herein in its entirety.

What is claimed is:

1. An information processing apparatus having a Web browser for displaying a screen provided by a Web server, the apparatus comprising:
    at least a processor and memory, cooperating to function as:
    a storage unit configured to store information of a history of screens displayed by the Web browser;
    a selection unit configured to select a Web application to be used via the Web browser;
    a determination unit configured to determine whether or not the selected Web application is identical to a Web application used last time; and
    a deletion unit configured to delete the information stored by the storage unit when the determination unit determines that the selected Web application is not identical to the Web application used last time.

2. The apparatus according to claim 1, further comprising a display configured to display a selection screen for selecting an application,
    wherein the selection unit selects the Web application to be used in accordance with a user's operation via the displayed selection screen.

3. The apparatus according to claim 2, the at least one processor and memory cooperating to function further as an activation unit configured to activate the selected Web application when the application selected by a user via the selection screen is the selected Web application.

4. The apparatus according to claim 1, the at least one processor and memory cooperating to function further as a control unit configured to control, when an instruction for displaying a screen previously displayed by the Web browser is entered, to display the screen using the information stored by the storage unit.

5. The apparatus according to claim 1, wherein the determination unit performs the determination by comparing a URL corresponding to the selected Web application and a URL corresponding to the Web application used last time.

6. A method for controlling an information processing apparatus having a Web browser for displaying a screen provided by a Web server, and a storage unit for storing information of a history of screens displayed by the Web browser, the method comprising the steps of:
    selecting a Web application to be used via the Web browser;
    determining whether or not the selected Web application is identical to a Web application used last time; and
    deleting the information stored on the storage unit when it is determined that the selected Web application is not identical to the Web application used last time,
    wherein at least one of the steps is executed by a computer.

7. The method according to claim 6, further comprising the step of
    displaying a selection screen for selecting an application,
    wherein the selecting step includes selecting the Web application to be used in accordance with a user's operation via the displayed selection screen.

8. The method according to claim 7, further comprising the step of activating the selected Web application when the application selected by a user via the selection screen is the selected Web application.

9. The method according to claim 6, further comprising the step of controlling, when an instruction for displaying a screen previously displayed by the Web browser is entered, to display the screen using the information stored on the storage unit.

10. The method according to claim 6, wherein the determination step includes performing the determination by comparing a URL corresponding to the selected Web application and a URL corresponding to the Web application used last time.

11. A non-transitory computer-readable storage medium storing an executable program for causing a computer to execute a method for controlling an information processing apparatus having a Web browser for displaying a screen provided by a Web server, and a storage unit for storing information of a history of screens displayed by the Web browser, the method comprising the steps of:
    selecting a Web application to be used via the Web browser;
    determining whether or not the selected Web application is identical to a Web application used last time; and
    deleting the information stored on the storage unit when it is determined that the selected Web application is not identical to the Web application used last time.

* * * * *